United States Patent
Hebbale et al.

(10) Patent No.: US 8,392,091 B2
(45) Date of Patent: Mar. 5, 2013

(54) USING GPS/MAP/TRAFFIC INFO TO CONTROL PERFORMANCE OF AFTERTREATMENT (AT) DEVICES

(75) Inventors: Kumaraswamy V. Hebbale, Troy, MI (US); Kushal Narayanaswamy, Sterling Heights, MI (US); Man-Feng Chang, Troy, MI (US); Jyh-Shin Chen, Troy, MI (US); Yue-Yun Wang, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1230 days.

(21) Appl. No.: 12/196,608

(22) Filed: Aug. 22, 2008

(65) Prior Publication Data

US 2010/0043404 A1    Feb. 25, 2010

(51) Int. Cl.
G06F 19/00    (2011.01)
F01N 11/00    (2006.01)

(52) U.S. Cl. .......................................... 701/102; 60/274
(58) Field of Classification Search ................. 60/274, 60/276, 277, 286, 297, 300; 701/102, 115
See application file for complete search history.

(56) References Cited

U.S. PATENT DOCUMENTS 6,032,461 A    3/2000    Kinugasa
2005/0166580 A1    8/2005    Pfaeffle et al.

FOREIGN PATENT DOCUMENTS

| CN | 1295948 A | 5/2001 |
|----|-----------|--------|
| CN | 1202219 A | 5/2002 |
| CN | 1386161 A | 12/2005 |
| DE | 4100133 A1 | 7/1992 |
| DE | 69625823 T2 | 9/2003 |
| DE | 102006005505 A1 | 2/2006 |
| DE | 102005022420 A1 | 6/2006 |
| GB | 2393404 A | 3/2004 |
| JP | 2000240431 A | 9/2005 |

OTHER PUBLICATIONS

Wang, Dynamic Modeling of a Lean NOx Trap for Lean Burn Engine Control, Proceedings of the American Control Conference, Jun. 1999, pp. 1208-1212, San Diego, CA.
Muller, Vehicle Speed Prediction for Driver Assistance Systems, SAE 2004-01-0170, 2004 SAE World Congress, Mar. 2004, Detroit, MI.
Hendricks, Engine Modelling for Control Applications: A Critical Survey, Meccanica 32, 1997, pp. 387-396, Kluwer Academic Publishers, Netherlands.

Primary Examiner — Stephen K Cronin
Assistant Examiner — Arnold Castro (57) ABSTRACT

A method for managing an exhaust aftertreatment system within a vehicle including a catalyst device includes monitoring a digital map device providing a predicted vehicle operating condition through a travel route, and determining a predicted exhaust gas temperature profile based upon the monitoring of the digital map device. Operation of the catalyst device is controlled based upon the predicted exhaust gas temperature profile.

33 Claims, 4 Drawing Sheets

USING GPS/MAP/TRAFFIC INFO TO CONTROL PERFORMANCE OF AFTERTREATMENT (AT) DEVICES

TECHNICAL FIELD

This disclosure is related to control of aftertreatment of NOx emissions in internal combustion engines.

BACKGROUND

The statements in this section merely provide background information related to the present disclosure and may not constitute prior art.

Emissions control is an important factor in engine design and engine control. Nitrogen oxide (NOx) is a known by-product of combustion. NOx is created by nitrogen and oxygen molecules present in engine intake air disassociating in the high temperatures of combustion. Rates of NOx creation include known relationships to the combustion process, for example, with higher rates of NOx creation being associated with higher combustion temperatures and longer exposure of air molecules to the higher temperatures. Additionally, carbon monoxide (CO) and unburnt hydrocarbons or particulate matter (PM), frequently occurring in the form of soot or diesel/gasoline particulates, are also by-products of combustion. Reduction and management of such emissions in an exhaust aftertreatment system are desirable.

A number of strategies are known to manage emissions in an aftertreatment system. A TWC, used in conjunction with a gasoline powered engine, is known to provide within a certain temperature range a means to chemically react in real-time components within the exhaust gas flow, changing pollutants into non-polluting substances. For example, NOx is converted into nitrogen and oxygen molecules, CO is combined with oxygen to form $CO_2$, and unburnt hydrocarbons are reformed into $CO_2$ and water. Similarly, a diesel oxidation catalyst (DOC) in real time provides a means to oxidize CO and unburnt hydrocarbons into CO2 and water within an exhaust gas flow from a diesel engine. Lean NOx trap devices are known, utilizing a catalyst element to store or adsorb NOx, particularly during periods when the engine is operated lean of stoichiometry. The NOx trap eventually becomes full, and a cleaning or regeneration cycle must be initiated to purge the NOx trap. Regeneration cycles are known to consist of periods of stoichiometric or, preferably, rich engine operation, with reductant species (CO or unburned hydrocarbons) generated from the rich engine operation, converting the NOx into nitrogen and oxygen, as described above. Similarly, a particulate filter device (PF) stores soot from the exhaust gas stream that is generated from the engine. As the PF becomes full, a regeneration cycle must be initiated to purge the stored soot by elevating the temperature of the PF to a range conducive to oxidizing the soot. As is also known in the art, the storage capacity of devices such as the NOx trap and the PF are temperature dependent. A selective catalyst reduction device (SCR) is known to utilize ammonia as a reducing agent to facilitate the conversion of NOx. Ammonia may be introduced by the injection of urea into the exhaust gas flow from a storage tank. Additionally, oxygen can be introduced by an induction system into an oxygen depleted exhaust gas flow, facilitating the conversion of CO. Additionally, ammonia is known to be a normal by-product of reactions within a LNT or TWC under certain conditions, and processes are known to be utilized to capture or store this ammonia for later use in an SCR. However, these aftertreatment devices and the chemical reactions enabled within are temperature dependent, and if exhaust temperatures vary from the operative temperature ranges of the device, the named reactions cannot take place in real-time.

Devices trapping or storing combustion by-products provide a means to accomplish both fuel efficient operation and low emissions by periodically cleaning the storage device. As described above, a regeneration cycle typically involves operation of the device in a temperature range higher than the exhaust gas temperatures during lean operation or operation at low engine speeds and loads. If operating conditions force a suspension of a regeneration cycle, the regeneration cycle may be forced to divide into several sub-regenerations because of the interruption. Each time a sub-regeneration is initiated, the device being regenerated requires a re-heating time, requiring an additional expenditure of fuel required to heat the device. Additionally, sub-regenerations cause thermal-fatigue and shorten catalyst life. A result of partial regenerations can be sintering of the catalyst, resulting in decreased performance of the device and higher maintenance requirements.

Additional strategies are known for treating combustion by-products in an exhaust gas flow when conditions are outside of temperature ranges conducive to efficient operation of aforementioned aftertreatment devices. Strategies are known to control the temperature of an exhaust gas flow to bring either over-temperature or under-temperature exhaust gases into a temperature range more conducive to aftertreatment. For example, an air induction system can be used to introduce ambient temperature air into the exhaust gas flow, thereby lowering the temperature of the exhaust gas flow. Electrical heating devices or fuel-fired heating devices can be used within or upstream of a device to elevate the temperatures of the exhaust gas flow within the device.

Strategies are also known to protect temperature sensitive devices from high exhaust gas temperatures. For example, a TWC is frequently located in close proximity to the exhaust manifold, exposing the device to the exhaust gas flow immediately after the flow exits the engine. The catalytic element and related chemicals or coatings utilized to facilitate the reactions within the device can breakdown as a result of exposure to high temperatures. An exhaust diverter valve is known to channel some portion or all of the exhaust gas flow away from the sensitive device, thereby protecting the device from the high temperature flow.

Engine or powertrain control strategies can be implemented to modify exhaust gas temperatures being generated by the combustion cycle. As aforementioned, lean combustion modes are known to result in lower exhaust gas temperatures, and stoichiometric or rich combustion modes are known to result in higher exhaust gas temperatures. If a particular temperature range of exhaust gas is needed, an engine control strategy, as implemented for example within an engine control module, can be modified to generate the desired exhaust gas temperature. For instance, as described above in relation to regeneration cycles, a rich combustion mode can be implemented to raise exhaust gas temperatures. Alternatively, lean combustion modes can be utilized to lower exhaust gas temperatures under conditions where lean operation is possible. Also, hybrid powertrains utilizing alternative energy sources are known, such as electric machines powered by electrical energy stored in an electric storage device such as a battery. Operation of such an exemplary powertrain can include operation solely under power of an engine, solely under power of an electric machine or machines, or some combination of the two. Work output of an engine has a direct impact upon the heat carried from the engine within the exhaust gas flow. Higher engine loads require a greater throttle setting to accomplish the same engine speed. Additionally, lean combustion modes, described above, only operate under lower engine loads. Higher engine loads can require stoichiometric or rich engine modes, generating higher exhaust gas temperatures. Because the variable operation of the engine changes the resulting load upon the engine, and because the load upon the engine directly impacts the temperature of the exhaust gas flow, a hybrid control strategy can be used to modulate the engine load, and thereby modulate the resulting exhaust gas flow temperatures. For example, in periods where a lower exhaust gas temperature is required, a hybrid control strategy can control a greater amount of the load to be carried by the electric machine, lowering the load carried by the engine. Alternatively, in a period where a PF is in the process of being regenerated, a hybrid control strategy can be implemented to either transfer load to the engine by disabling or disengaging the electric machine or even increasing the load upon the engine by operating the electric machine in a generator mode, thereby increasing the load upon the engine in excess of the load normally applied to the engine.

Known powertrain architectures utilizing hybrid energy sources include torque-generative devices, including internal combustion engines and electric machines, which transmit torque through a transmission device to an output member. One exemplary powertrain includes a two-mode, compound-split, electro-mechanical transmission which utilizes an input member for receiving motive torque from a prime mover power source, preferably an internal combustion engine, and an output member. The output member can be operatively connected to a driveline for a motor vehicle for transmitting tractive torque thereto. Electric machines, operative as motors or generators, generate a torque input to the transmission, independently of a torque input from the internal combustion engine. The electric machines may transform vehicle kinetic energy, transmitted through the vehicle driveline, to electrical energy that is storable in an electrical energy storage device. A control system monitors various inputs from the vehicle and the operator and provides operational control of the powertrain, including controlling transmission operating state and gear shifting, controlling the torque-generative devices, and regulating the electrical power interchange among the electrical energy storage device and the electric machines to manage outputs of the transmission, including torque and rotational speed. Strategies for balancing the different highly efficient operation under electrical power and high output operation under combustion are known, and these balancing strategies allow for flexibility through different operating conditions. Through modulation of the various components of the powertrain, the vehicle can take advantage of operating conditions especially beneficial to particular modes of operation, reclaim kinetic energy as potential energy, and store that potential energy in an energy storage device, thereby allowing storage and later low or zero emission use of energy that would normally be dissipated through vehicle braking.

Engine control strategies utilized to enhance vehicle performance take many forms. New engine mechanisms provide means to increase efficiency. For example, cylinder deactivation is a method known in the art wherein a vehicle control system determines a required torque input from the engine, and only utilizes the proportion of cylinders in the engine necessary to efficiently deliver that torque. Another example includes enhanced engine valve operation, for instance, variable valve trains, enabling unthrottled operation controlling air intake by the opening of the valves, thereby reducing pumping losses associated with throttled operation. In another instance, variable valve trains in combination with variable spark timing and enabling engine control mechanisms allow manipulation of the combustion cycle to match optimal combustion for particular operating conditions. Variable valve trains, injection, and spark timings are known to be utilized to manipulate exhaust gas flow temperatures. For example, spark timing retarded from usual timing is known to be used to force more heat of combustion through the exhaust, thereby elevating temperatures in aftertreatment devices. Advancing, retarding, or multiple event fuel injection timing is also known to produce a similar result. Additionally, fuel injection is known to be utilized in the exhaust system or aftertreatment system to reform the fuel in the exhaust gas flow as a means to raise temperature in the aftertreatment system. Additionally, advanced engines include a variety of control strategies, for example, taking advantage of in-cylinder pressure sensing and high speed processing to optimize and adjust combustion from cycle to cycle. Additionally, new combustion processes provide flexible combustion parameters with different optimal ranges. Combustion within conventional gasoline and diesel engines was long performed at stoichiometric and lean fuel air ratio, respectively, providing a mixture of the two chemical components (fuel and oxidizer) necessary to sustain optimal combustion reaction. Modern combustion processes have been developed, for example, homogeneous charge compression ignition (HCCI), premixed charge compression ignition (PCCI) and stratified charge spark ignition direct-injection (stratified SIDI), by taking advantage of unconventional charge concentrations, charge mixtures, and ignition methods to more efficiently extract energy from the charge. Each of the above improvements to engine control strategies are highly dependent upon vehicle operating conditions, such as engine speed and engine load.

Each combustion process includes ranges and conditions necessary or favorable to efficient operation. For example, HCCI combustion requires an internal combustion engine designed to operate under an Otto cycle. The engine, equipped with direct in-cylinder fuel-injection, operates in a controlled auto-ignition mode under specific engine operating conditions to achieve improved engine fuel efficiency. A spark ignition system is employed to supplement the auto-ignition combustion process during specific operating conditions. An HCCI engine operating in HCCI combustion mode creates a charge mixture of combusted gases, air, and fuel in a combustion chamber, and auto-ignition is initiated simultaneously from many ignition sites within the charge mixture during a compression stroke, resulting in stable power output, high thermal efficiency and low emissions. The combustion is highly diluted and uniformly distributed throughout the charge mixture, resulting in low burnt gas temperature and NOx emissions typically substantially lower than NOx emissions of either a traditional spark ignition engine, or a traditional diesel engine.

PCCI is a known engine operating mode and is a similar engine operating mode to the aforementioned HCCI mode. One having ordinary skill in the art will appreciate that PCCI is essentially a diesel equivalent to HCCI operated in gasoline engines. Diesel engines operating in particular speed and load ranges and running in a PCCI mode can realize advantageous engine emissions result in comparison to diesel engines operating under conventional lean operation.

Stratified charge SIDI (stratified SIDI) is also a known engine combustion mode and is a means to improve engine performance under particular operating conditions. One having ordinary skill will appreciate that stratified SIDI includes, within a particular operating range, managing the concentration and pattern of fuel-air mixture around the spark plug at the spark time using direct in-cylinder gasoline injection and intentionally creating an efficient combustion event acting upon the piston, thereby increasing the engine efficiency.

Electronic means of tracking vehicle position and coordinating a position of a vehicle with geographic, road, traffic, or other information are known. Monitoring such data is known as utilizing map preview information. A known and accessible electronic means to accomplish such data acquisition includes use of global position systems (GPS) in coordination with electronic maps, digital map software using means to track the movement of the vehicle, internet-based wireless-accessible data processing, vehicle to vehicle communications, and vehicle to infrastructure communications and other remote computing resources. Information so made available include road classification, such as highway, local road, parking lot, gravel road, etc.; speed limits for various stretches of road; traffic conditions for various stretches of road, including real-time evaluations of congestion, signals sent from cooperating vehicles experiencing traffic, analysis of cellular phone patterns in other cars, predictions based upon likely rush hour traffic or sporting event traffic; road slopes; road curvature; location and status of traffic lights, signals, construction zone markers, speed bumps, or other traffic direction indicators impacting vehicular travel; existence or lack of features likely to impact travel along a certain stretch of road, such as exit ramps or truck weigh stations; and analysis of vehicle or specific operator driving patterns, habits, registered schedules, electronic planner calendars, or other predictive measures. Additionally, likely routes of travel can be estimated based upon operator entered destinations, computerized analysis of driver habits and patterns, or other means known in the art.

SUMMARY

An exhaust aftertreatment system within a vehicle includes a catalyst device. A method for managing the system includes monitoring a digital map device providing a predicted vehicle operating condition through a travel route, and determining a predicted exhaust gas temperature profile based upon the monitoring of the digital map device. Operation of the catalyst device is controlled based upon the predicted exhaust gas temperature profile.

BRIEF DESCRIPTION OF THE DRAWINGS

One or more embodiments will now be described, by way of example, with reference to the accompanying drawings, in which.

DETAILED DESCRIPTION

Figure 1:
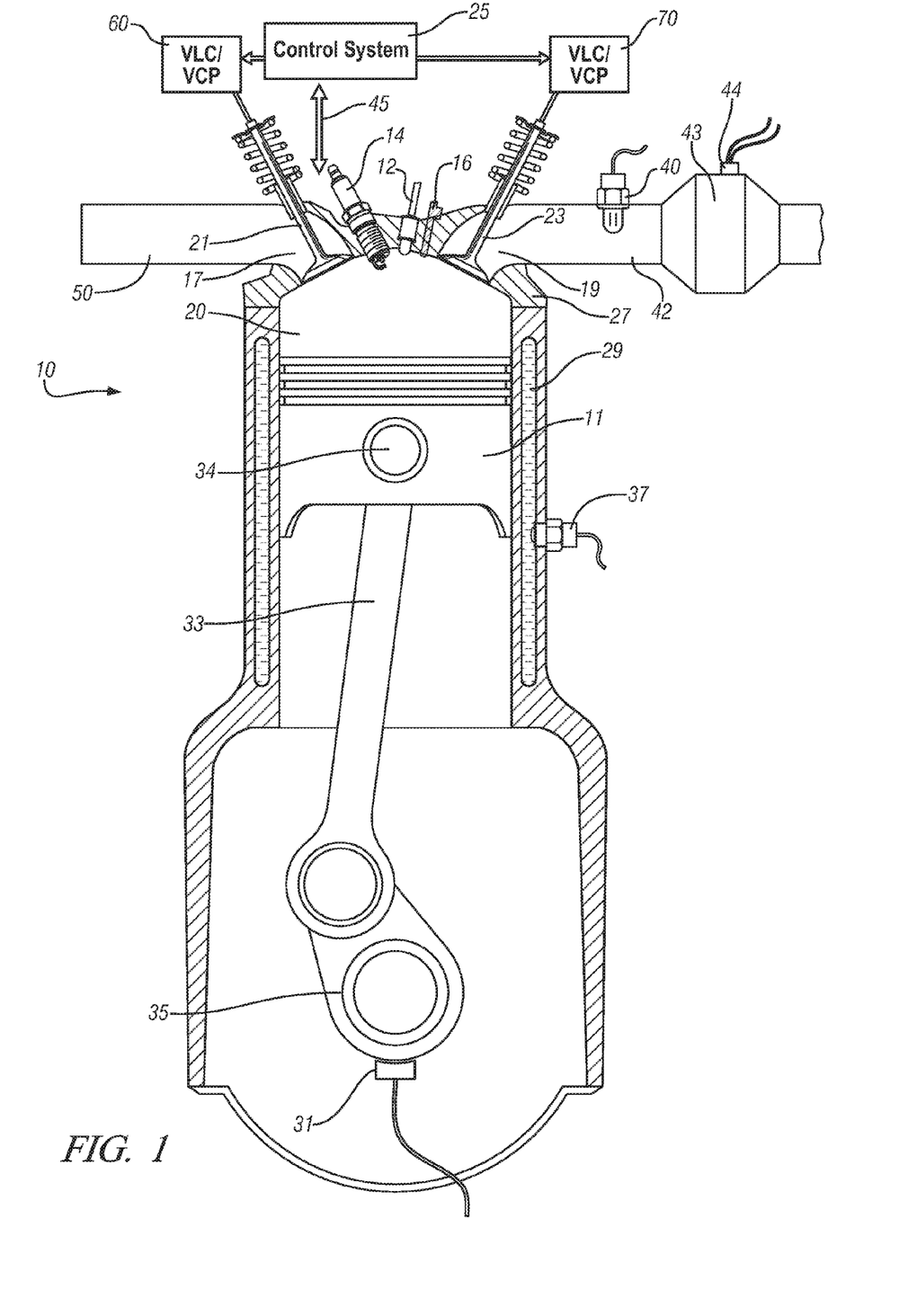
FIG. 1 schematically depicts an exemplary internal combustion engine and control system which has been constructed in accordance with an embodiment of the present disclosure.

Referring now to the drawings, wherein the showings are for the purpose of illustrating certain exemplary embodiments only and not for the purpose of limiting the same, FIG. 1 schematically depicts an exemplary internal combustion engine 10 and control system 25 which has been constructed in accordance with an embodiment of the present disclosure. The embodiment as shown is applied as part of an overall control scheme to operate an exemplary multi-cylinder, spark ignition, direct-injection, gasoline, four-stroke internal combustion engine adapted to operate under a controlled auto-ignition process, also referred to as homogenous-charge, compression-ignition ('HCCI') mode In the present exemplary exposition of the disclosure, a naturally aspirated, a four-stroke, single cylinder, 0.55 liter, controlled auto-ignition, gasoline direct injection fueled internal combustion engine having a compression ratio of 12 was utilized in implementing the valve and fueling controls and acquisition of the various data embodied herein. Unless specifically discussed otherwise, all such implementations and acquisitions are assumed to be carried out under standard conditions as understood by one having ordinary skill in the art.

The exemplary engine 10 includes a cast-metal engine block with a plurality of cylinders formed therein, one of which is shown, and an engine head 27. Each cylinder comprises a closed-end cylinder having a moveable, reciprocating piston 11 inserted therein. A variable volume combustion chamber 20 is formed in each cylinder, and is defined by walls of the cylinder, the moveable piston 11, and the head 27. The engine block preferably includes coolant passages 29 through which engine coolant fluid passes. A coolant temperature sensor 37, operable to monitor temperature of the coolant fluid, is located at an appropriate location, and provides an input to the control system 25 useable to control the engine. The engine preferably includes known systems including an external exhaust gas recirculation ('EGR') valve and an intake air throttle valve (not shown).

Each moveable piston 11 comprises a device designed in accordance with known piston forming methods, and includes a top and a body which conforms substantially to the cylinder in which it operates. The piston has top or crown area that is exposed in the combustion chamber. Each piston is connected via a pin 34 and connecting rod 33 to a crankshaft 35. The crankshaft 35 is rotatably attached to the engine block at a main bearing area near a bottom portion of the engine block, such that the crankshaft is able to rotate around an axis that is perpendicular to a longitudinal axis defined by each cylinder. A crank sensor 31 is placed in an appropriate location, operable to generate a signal that is useable by the controller 25 to measure crank angle, and which is translatable to provide measures of crankshaft rotation, speed, and acceleration that are useable in various control schemes. During operation of the engine, each piston 11 moves up and down in the cylinder in a reciprocating fashion due to connection to and rotation of the crankshaft 35, and the combustion process. The rotation action of the crankshaft effects translation of linear force exerted on each piston during combustion to an angular torque output from the crankshaft, which can be transmitted to another device, e.g. a vehicle driveline.

The engine head 27 comprises a cast-metal device having one or more intake ports 17 and one or more exhaust ports 19 which flow to the combustion chamber 20. The intake port 17 supplies air to the combustion chamber 20. Combusted (burned) gases flow from the combustion chamber 20 via exhaust port 19. Flow of air through each intake port is controlled by actuation of one or more intake valves 21. Flow of combusted gases through each exhaust port is controlled by actuation of one or more exhaust valves 23.

The intake and exhaust valves 21, 23 each have a head portion that includes a top portion that is exposed to the combustion chamber. Each of the valves 21, 23 has a stem that is connected to a valve actuation device. A valve actuation device, depicted as 60, is operative to control opening and closing of each of the intake valves 21, and a second valve actuation device 70 operative to control opening and closing of each of the exhaust valves 23. Each of the valve actuation devices 60, 70 comprises a device signally connected to the control system 25 and operative to control timing, duration, and magnitude of opening and closing of each valve, either in concert or individually. The first embodiment of the exemplary engine comprises a dual overhead cam system which has a variable lift control ('VLC') device and variable cam phasing ('VCP') device. The VCP device is operative to control timing of opening or closing of each intake valve and each exhaust valve relative to rotational position of the crankshaft and opens each valve for a fixed crank angle duration. The exemplary VLC device is operative to control magnitude of valve lift to one of two positions: one position to 3-5 mm lift for an open duration of 120-150 crank angle degrees, and another position to 9-12 mm lift for an open duration of 220-260 crank angle degrees. Individual valve actuation devices can serve the same function to the same effect. The valve actuation devices are preferably controlled by the control system 25 according to predetermined control schemes. Alternative variable valve actuation devices including, for example, fully flexible electrical or electro-hydraulic devices may also be used and have the further benefit of independent opening and closing phase control as well as substantially infinite valve lift variability within the limits of the system. A specific aspect of a control scheme to control opening and closing of the valves is described herein.

Air is inlet to the intake port 17 through an intake manifold runner 50, which receives filtered air passing through a known air metering device and a throttle device (not shown). Exhaust gas passes from the exhaust port 19 to an exhaust manifold 42, which includes exhaust gas sensors 40 operative to monitor constituents of the exhaust gas feedstream, and determine parameters associated therewith. The exhaust gas sensors 40 can comprise any of several known sensing devices operative to provide parametric values for the exhaust gas feedstream, including air/fuel ratio, or measurement of exhaust gas constituents, e.g. NOx, CO, HC, $O_2$ and others. The system may include an in-cylinder sensor 16 for monitoring combustion pressures, or non-intrusive pressure sensors or inferentially determined pressure determination (e.g. through crankshaft accelerations). The aforementioned sensors and metering devices each provide an input to the control system 25. These inputs can be used by the control system to determine combustion performance measurements.

Exemplary aftertreatment device 43 is illustrated, connected to exhaust manifold 42 and transmitting exhaust gas flow through the exhaust gas system. Aftertreatment device 43 can be optionally equipped with an aftertreatment sensor 44, as shown. Aftertreatment sensor can monitor important parameters of aftertreatment device 43, for example, device temperature. Aftertreatment device 43 is used to manage properties and composition of the exhaust gas flow. As aforementioned, aftertreatment devices are known to include devices effective to convert or adsorb for later treatment NOx emissions within the exhaust gas flow.

The control system 25 preferably comprises a subset of an overall control architecture operable to provide coordinated system control of the engine 10 and other systems. In overall operation, the control system 25 is operable to synthesize operator inputs, ambient conditions, engine operating parameters, and combustion performance measurements, and execute algorithms to control various actuators to achieve targets for control parameters, including such parameters as fuel economy, emissions, performance, and driveability. The control system 25 is operably connected to a plurality of devices through which an operator typically controls or directs operation of the engine. Exemplary operator inputs include an accelerator pedal, a brake pedal, transmission gear selector, and vehicle speed cruise control when the engine is employed in a vehicle. The control system may communicate with other controllers, sensors, and actuators via a local area network ('LAN') bus (not shown) which preferably allows for structured communication of control parameters and commands between various controllers.

The control system 25 is operably connected to the engine 10, and functions to acquire data from sensors, and control a variety of actuators of the engine 10 over appropriate interfaces 45. The control system 25 receives an engine torque command, and generates a desired torque output, based upon the operator inputs. Exemplary engine operating parameters that are sensed by control system 25 using the aforementioned sensors include engine temperature, as indexed by methods such as monitoring engine coolant temperature, oil temperature, or metal temperature; crankshaft rotational speed ('RPM') and position; manifold absolute pressure; ambient air flow and temperature; and ambient air pressure. Combustion performance measurements typically comprise measured and inferred combustion parameters, including air/fuel ratio, location of peak combustion pressure, among others.

Actuators controlled by the control system 25 include: fuel injectors 12; the VLC/VCP valve actuation devices 60, 70; spark plug 14 operably connected to ignition modules for controlling spark dwell and timing; exhaust gas recirculation (EGR) valve (not shown), and, electronic throttle control module (not shown). Fuel injector 12 is preferably operable to inject fuel directly into each combustion chamber 20. Specific details of exemplary direct injection fuel injectors are known and not detailed herein. Spark plug 14 is employed by the control system 25 to enhance ignition timing control of the exemplary engine across portions of the engine speed and load operating range. When the exemplary engine is operated in a purely HCCI mode, the engine does not utilize an energized spark plug. However, it has proven desirable to employ spark ignition to complement the HCCI mode under certain conditions, including, e.g. during cold start, to prevent fouling and, in accordance with certain aspects of the present disclosure at low load operating conditions near a low-load limit. Also, it has proven preferable to employ spark ignition at a high load operation limit in the HCCI mode, and at high speed/load operating conditions under throttled or un-throttled spark-ignition operation.

The control system 25 preferably comprises a general-purpose digital computer generally comprising a microprocessor or central processing unit, read only memory (ROM), random access memory (RAM), electrically programmable read only memory (EPROM), high speed clock, analog to digital (A/D) and digital to analog (D/A) circuitry, and input/ output circuitry and devices (I/O) and appropriate signal conditioning and buffer circuitry. Each controller has a set of control algorithms, comprising resident program instructions and calibrations stored in ROM.

Algorithms for engine control are preferably executed during preset loop cycles such that each algorithm is executed at least once each loop cycle. Algorithms stored in the non-volatile memory devices are executed by the central processing unit and are operable to monitor inputs from the sensing devices and execute control and diagnostic routines to control operation of the engine, using preset calibrations. Loop cycles are typically executed at regular intervals, for example each 3.125, 6.25, 12.5, 25 and 100 milliseconds during ongoing engine operation. Alternatively, algorithms may be executed in response to occurrence of an event or interrupt request.

Figure 2:
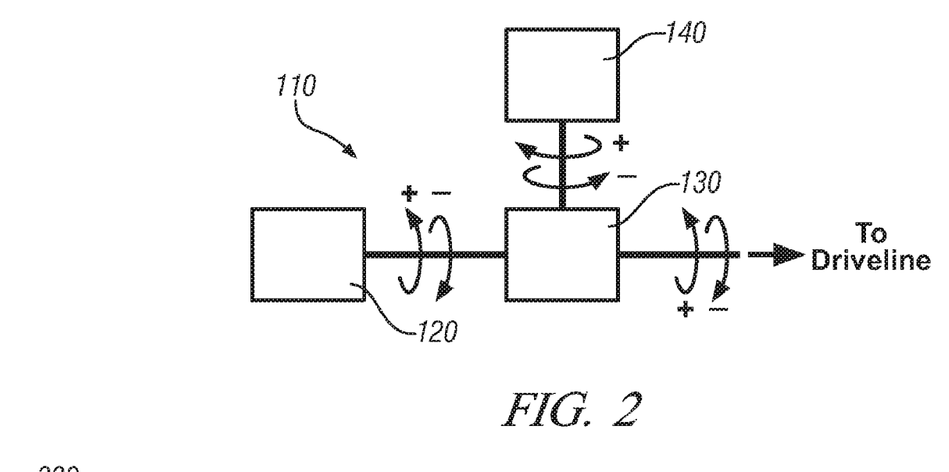
FIG. 2 schematically depicts a known hybrid powertrain, illustrating input torques applied from an engine and an electric machine, illustrating relationship between input torques and output torques applied across a transmission assembly, in accordance with the present disclosure.

FIG. 2 schematically depicts a known hybrid powertrain, illustrating input torques applied from an engine and an electric machine, illustrating relationship between input torques and output torques applied across a transmission assembly, in accordance with the present disclosure. Hybrid drive vehicles utilize an engine and at least one electric machine to accomplish providing power to the driveline of the vehicle and recovering energy to an energy storage device. FIG. 2 depicts vehicle 110 comprising engine 120, transmission 130, and electric machine 140. As depicted by the multi-directional arrows between the various elements and as described above, input torques from the engine and the electric machine and the output torque can be applied in either a forward or reverse direction, reflecting the above mentioned alternative functions that may be served within the hybrid powertrain. A hybrid control system, such as the hybrid control module, monitors the demanded vehicle speed and powertrain load requirements and manages the hybrid drive components to deliver the required output torque to meet the speed and load requirements while fulfilling alternative functions according to a set of programmed priorities.

Figure 3:
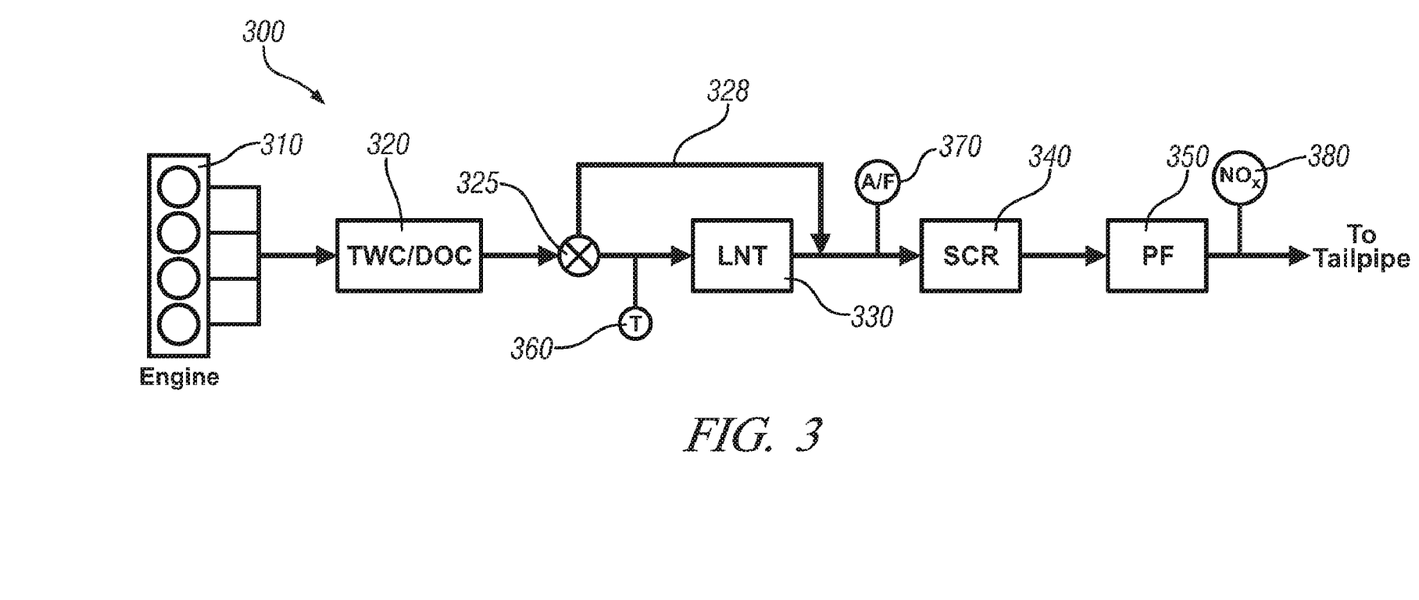
FIG. 3 schematically illustrates an exemplary aftertreatment system, in accordance with the present disclosure.

FIG. 3 schematically illustrates an exemplary aftertreatment system, in accordance with the present disclosure. Aftertreatment system 300 comprises an engine 310, a catalytic converter device 320, a lean NOx trap (LNT) 330, a selective catalytic reduction device (SCR) 340, and a particulate filter (PF) 350. Operation of the described devices within an aftertreatment system is known in the art, involve known technologies and methodologies to manage an exhaust gas flow, and will not be described in detail herein. Insofar as is most relevant to the present disclosure, catalytic converter device 320 can include a three-way catalyst (TWC) device, commonly used with light-duty gasoline vehicles, or a diesel oxidation catalyst (DOC) device, commonly used with diesel vehicles. A TWC device is used to convert NOx, HC, and CO into emissions conforming gases. A DOC device is used to convert CO, HC, and unburned diesel fuel into emissions conforming gases. Operation of a LNT is described in detail above. LNTs have been known for use in diesel vehicles, and with the development of lean combustion modes in gasoline engines and the associated lower temperatures not always sufficient to facilitate NOx conversion within the TWC, LNTs are known equivalently to be used in gasoline vehicles. An SCR device is used in diesel and gasoline vehicles, one embodiment for example utilizing ammonia in a reduction reaction to convert NOx into nitrogen and oxygen molecules. A PF is a device utilized to trap soot particles of varying sizes known to be emitted from an engine and stores them. Similar to regeneration events associated with an LNT, periods of higher temperature are used to clean or regenerate the PF of accumulated soot particles. Additionally, exemplary aftertreatment system 300 includes additional devices utilized to perform particular functions associated with the operation of the aforementioned devices. For instance, bypass valve 325 is depicted to select channeling exhaust gas flow through LNT 330 or through a bypass circuit 328. Known LNT devices can be sensitive to exhaust gas temperatures in excess of a particular threshold. If exhaust gas temperatures approach or pass such a threshold, for instance as measured by exhaust gas temperature sensor 360, bypass valve 325 can be activated to protect the LNT. Additionally, air/fuel ratio sensor 370 and NOx sensor 380 are depicted, enabling control of the aftertreatment system by monitoring properties of the exhaust gas flow at various points in the aftertreatment system.

Each of the aftertreatment devices operates to manage pollutants within the exhaust gas flow as described above. Each device includes chemical or thermal reactions, converting undesirable combustion by-products into acceptable emissions through known processes. The thermal reactions, such as elevating temperatures within a PF to burn off accumulated soot particles, are sensitive to exhaust gas temperatures as a threshold temperature is required to achieve the requisite thermal reactions. Chemical reactions, similarly, are known to require operation in a particular temperature range, wherein temperatures that are either too low or too high can either inhibit the desired chemical reaction or can damage the workings of the device. Diesel engines operating in a certain range and gasoline engines—in particular, gasoline engines operating in a lean combustion mode—are known to operate with high efficiency, translating much of the energy from the combustion charge into work and not much energy into heat traveling out through the exhaust.

Engines operating periodically in highly efficient modes and periodically in high speed, high load modes of normally elevated exhaust temperatures are known to purge aftertreatment devices as a matter of normal operation, with the periods of elevated temperatures being utilized to achieve the desired regenerative results. As described above, other methods are known to manage heat through aftertreatment devices when normal operation fails to achieve operating exhaust gas temperatures necessary to perform aftertreatment. One known method utilizes engine control methods, for example, retarding spark timing, to force more heat through the exhaust system. Utilizing occasional periods of increased heat rejection through the exhaust system can achieve elevated temperatures within aftertreatment devices, allowing the vehicle to operate normally in lean or fuel efficient operating modes and occasionally operate in regenerative high heat rejection modes to facilitate aftertreatment functions. However, regeneration events, once begun, are preferably carried through to completion. High temperatures resulting from high speed, high load conditions quickly fall if the vehicle is brought to a stop at a traffic signal or if the vehicle is parked. Detrimental effects to partial or aborted regeneration events include wasted fuel in the initiation of the regeneration event, uncleaned or partially-cleaned aftertreatment devices, or damage to the aftertreatment device.

Figure 4:
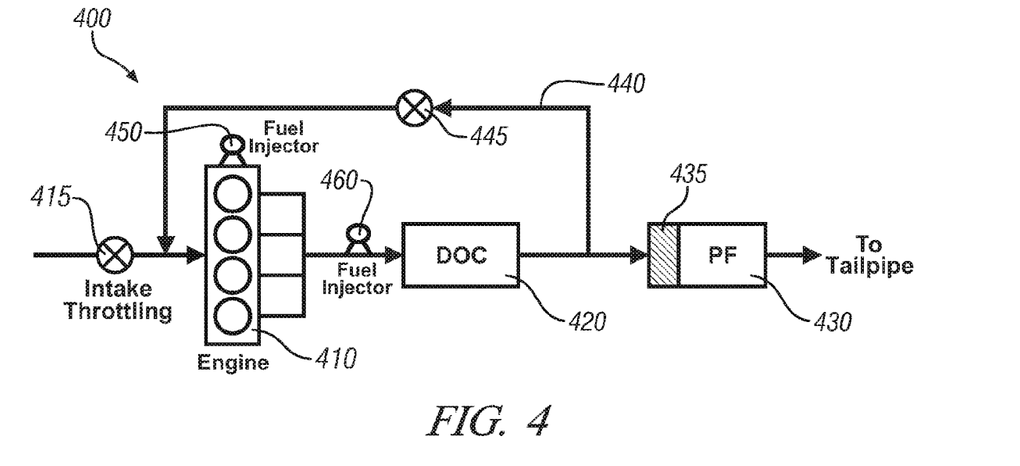
FIG. 4 schematically depicts an exemplary aftertreatment system configured with a number of devices operating to manage temperature of an exhaust gas flow emanating from a diesel engine, in accordance with the present disclosure.

Methods are known to mitigate the effects of unpredictable engine operating conditions. FIG. 4 schematically depicts an exemplary aftertreatment system configured with a number of devices operating to manage temperature of an exhaust gas flow emanating from a diesel engine, in accordance with the present disclosure. Aftertreatment system 400 comprises engine 410, a DOC device 420, and a PF 430. As described above, reactions within DOC device 420 and PF 430 require exhaust gas temperatures within certain ranges. A number of methods are known in the art through which exhaust gas temperatures can be modulated. For example, it is well known that retarding spark timing causes more of the energy in the combusting charge to be expelled from the combustion chamber in the exhaust, leading to higher exhaust gas temperatures. A similar result can be achieved by advancing the timing of fuel injection by fuel injector 450 or by modulating operation of intake throttling 415. A similar result can be achieved by injecting fuel directly into the exhaust gas flow through fuel injector 460. Additionally, it is known that modulation of intake throttling and modulation of EGR circuit 440 can be used to modulate exhaust gas temperatures. Also, as described above, auxiliary heater 435 can be utilized either within a device or upstream of a device to condition the exhaust gas with higher temperatures necessary for operation of the device. A single auxiliary heating device can be used to serve several devices, or individual devices can be configured with an auxiliary heating device.

It should be noted that the exemplary configurations of FIGS. 3 and 4 describe particular exemplary configurations and sequences of aftertreatment devices. Many alternate configurations and sequences of aftertreatment devices are known, and it will be appreciated by one having ordinary skill in the art that the methods described herein are not limited to the exemplary embodiments described. Many potential alternatives are envisioned, and the disclosure is not intended to be limited to the exemplary embodiments described herein.

Cleaning of aftertreatment devices storing combustion by-products can be scheduled in a number of ways. For example, the soot load of a PF can be estimated based on a vehicle traveled distance. In an exemplary vehicle, a PF regeneration can be triggered every 200 miles. This distance interval may be scaled based on engine load profiles. Before each regeneration, a warm up time is required to heat the catalyst inlet temperature of a PF up to some minimum device temperature, for example, 550 C. In another clean operation, LNT desulfation, the minimum device temperature is 650 C. Depending on an engine rating, a typical regeneration of PF takes, for example, from 10 to 20 minutes to complete, which includes a warm up period.

As described above, aftertreatment devices process combustion by-products within an exhaust gas flow in order to reduce or eliminate the level of combustion by-products leaving the system as undesirable emissions. However, efficiency and operation of aftertreatment devices depend upon the operating conditions of the system, in particular, the temperature of the exhaust gas flow. Methods are known to accommodate different powertrain operating strategies through some combination of processing combustion by-products, storing combustion by-products, and conditioning the exhaust gas flow to accomplish aftertreatment. However, these methods are largely dependent upon the operation of the powertrain in certain operating ranges to accomplish the various methods, and variability in operation based upon the conditions in which the powertrain is operated can have adverse impacts on aftertreatment. A method is disclosed to manage certain aspects of aftertreatment using information from a 3D map device in order to predict the operating conditions of the powertrain.

By using electronic devices as described above to monitor information about the environment surrounding a vehicle, a method can be utilized to predict vehicle travel including the vehicle's route and speed through the route, and in combination with other factors, for instance road slope or traffic light status, a prediction can be made regarding the engine speed and engine load likely to be demanded or experienced through the route. Vehicle operation, including vehicle speeds and likely output torque requirements through the route, can be utilized to plan operation of an aftertreatment system. Predictions required for this utilization can be made statically, for instance, determining the location of an upcoming uphill route and reacting to that upcoming change in conditions by preparing to switch from a fuel efficient mode, HCCI at a lean fuel ratio for example, to a mode capable of operating at higher engine loads, for example a spark-ignition, stoichiometric fuel ratio mode. Additionally, such predictions can be made in real-time, for instance, if an otherwise unremarkable route changes to indicate stopped traffic ahead. In such an instance, preference can be indicated to forestall initiation of a regeneration cycle or to implement auxiliary device heating in the anticipation of the upcoming slowdown and the resulting lower exhaust gas temperatures. Also, such a prediction can be made on the basis of probabilities, for example, a traffic light in a busy area can be monitored on the basis of other cooperating vehicles on the same road. In this example, if other vehicles reporting route data show that the light being approached has been green for a long time, the odds of an upcoming stop increase. As described above in relation to an expected stop, a factor can be tabulated utilizing the probability that the light signal being approached is about to turn red, and aftertreatment can be adjusted to compensate. In whichever method utilized, information regarding the predicted route of the vehicle can be used to create a predicted exhaust gas temperature profile through the route. This profile can then be used predict the impact upon the aftertreatment devices, to schedule corrective events such as regeneration cycles, and to intervene in the profile, utilizing auxiliary heating or forced powertrain control strategies, as needed, to facilitate efficient aftertreatment. In this way, information regarding the surroundings of the vehicle can be utilized to accomplish aftertreatment in the context of foreseeable vehicle operation.

Predictions of environmental conditions along some projected vehicle path can be done on within a variety of scopes. A projected vehicle path can be formulated by simply assuming that the vehicle will continue on the present road for some distance. A projected vehicle path can instead map out all likely turns which could be made by the vehicle some distance in front of the vehicle and include within any analysis a probabilistic factor of the path likely to be followed. A projected vehicle path can include a set or predicted destination by methods described above, and thereby the projected vehicle path can define a likely vehicle route of travel. Longer projected vehicle paths offer greater flexibility in selecting between engine operating modes or hybrid control strategies, creating advantageous predicted exhaust gas temperature profiles. However, uncertainty or incorrect assumptions regarding vehicle paths can lead to disadvantageous vehicle utilization. One example of such a disadvantageous utilization would be if a vehicle, projecting a path first on side roads and then on a highway, determined to utilize a highly fuel efficient mode resulting in high NOx emissions, thereby filling aftertreatment NOx fixing devices, in anticipation of high engine speeds and loads on the highway providing ideal conditions to purge the aftertreatment devices. If the vehicle deviates from the projected path, skipping the highway travel, less than ideal engine operating modes might have to be commanded after the deviation in order to offset the incorrectly predicted vehicle path. Certainty factors or margins of safety can be implemented within the selection of operating modes in order to mitigate such potentially disadvantageous conditions. Projected paths, certainty factors, and other methods utilized in forming operating strategies according to the methods described herein are recalculated iteratively or periodically. Such recalculations allow for adjustment on the fly such that the strategy developed can adapt to new conditions or unexpected events affecting aftertreatment.

One exemplary method to analyze information made available by a 3D map system includes generating a driver profile. Based on the operation of the vehicle, operation of the vehicle is classified into one of two groups. The first group is identified as daily commute-type profile, including conditions that predictively forecast an opportunity to perform regeneration cycles without interruption. An exemplary criteria to formulate a daily commute-type profile is characterized by a driving cycle that includes: a non-stop driving time past a threshold time, for example, at least 10 minutes; monitored road speed limits within a range conducive to a device temperature range, for example, speed limits between 25 and 75 miles per hour; a calculated vehicle load, monitored through fuel consumption, above a no-load line; a monitored device inlet temperature at least meeting a minimum device regeneration temperature; and a profile meeting a minimum consistency rating, for example showing the above conditions for at least four out of seven days in a test period. In order to test the above criteria, a driving cycle is defined as an engine key-on to key-off operation. If a driving cycle meets the first four conditions, corresponding route information, including a vehicle start location A and end location B, is stored in an ECM including input from a GPS system. A reverse route is considered as the same route. If four out of seven days, the vehicle travels the same route, this vehicle is characterized in the commute-type profile. Any vehicle not meeting the above criteria is characterized as a non-commute-type profile.

The above described method to profile vehicle travel routes is designed to enable regeneration of a device; however, different or multiple profiles can be utilized to characterize a recurring route for a multiple aftertreatment purposes. For instance, upon diagnosing that a vehicle belongs to the commuter-type group, and forecasting that the vehicle travels the route five days per seven day period, an aftertreatment plan can be utilized based upon the commuter travel route and the corresponding exhaust gas temperature profile generated. For example, if a route otherwise meets the conditions of a commuter-type profile, but tends to operate at a low load and low speed allowing normally for lean engine operation, an aftertreatment plan can be developed that once a week, the engine can be run rich through a period even though lean operation is enabled. In this way, the GPS information combined with the commuter-type profile allows for an expenditure of fuel in a regeneration cycle through a route with increased confidence that the regeneration cycle will not be interrupted. In another example, if a route, identified in a profile as described above, predicted through another analysis such as looking at a stretch of highway and likely exit ramps, or evaluated by a manually entered destination is known, and such a route includes a steep incline increasing the load upon the vehicle and making stoichiometric or rich operation more likely, then this feature to the route can be used to plan aftertreatment events.

In another exemplary embodiment of the invention, as described above, ammonia is useful in combination with an SCR device to convert NOx in conditions where other aftertreatment devices would not be able to process NOx. It is known in the art that ammonia, under certain conditions, is a natural by-product within some aftertreatment devices, for instance, a TWC or an LNT. Under known practices, with an aftertreatment system simply reacting to present conditions, this ammonia either passes through the aftertreatment system or is stored ad hoc in an SCR for later use when conditions change. With the use of a 3D map system, conditions enabling the production of ammonia can be predicted or facilitated, and an aftertreatment plan utilizing 3D map data can incorporate this ammonia production as an additional means to process NOx. Such use of ammonia generated within the aftertreatment system allows for systematic use of an SCR without having to store a supply of urea or other source of ammonia.

Figure 5:
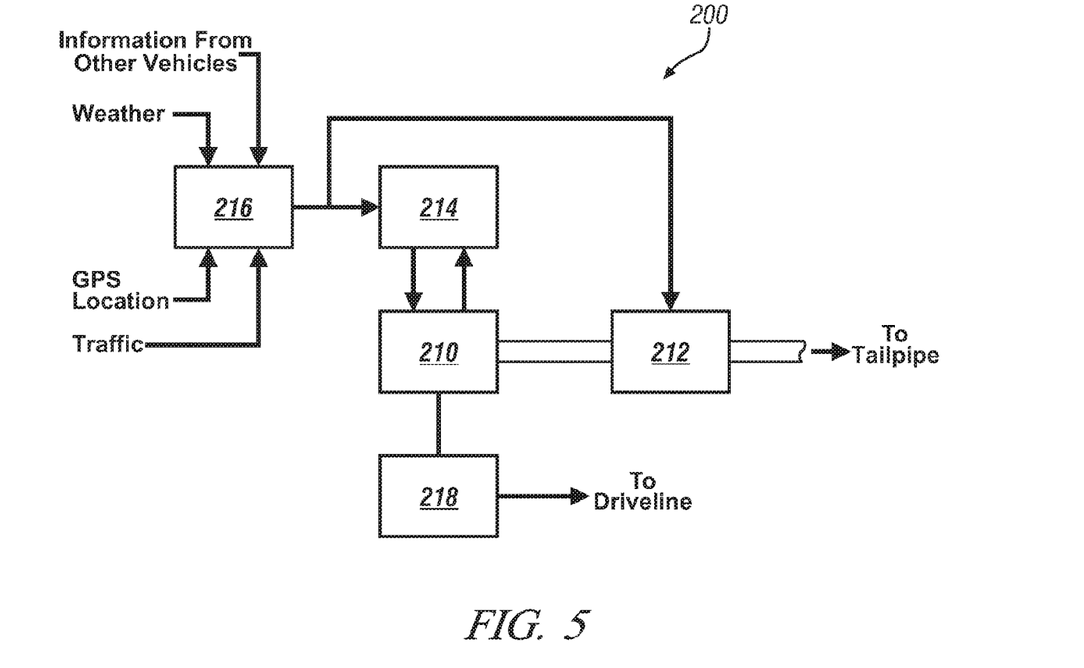
FIG. 5 schematically depicts a powertrain within a vehicle utilizing a 3D map device, in accordance with the present disclosure.

FIG. 5 schematically depicts a powertrain within a vehicle utilizing a 3D map device, in accordance with the present disclosure. Powertrain 200 includes engine 210, aftertreatment system 212, engine control module 214, transmission 218, and 3D map device 216. Engine 210 provides motive torque to transmission 218 in order to accomplish the operation of the powertrain. An exhaust gas flow resulting from combustion within engine 210 is processed through aftertreatment system 212 and eventually to a tailpipe. Engine control module 214 monitors various inputs and interactively controls the operation of engine 210. 3D map device 216 receives information related to the environment and a predicted route of the vehicle. Exemplary information received by 3D map device 216 includes weather; GPS location capable of being transposed with a digital map within device 216; traffic projections from an internet based service; and information from other vehicles, including details such as traffic congestion and traffic light information. 3D map device 216 provides information to engine control module 214 and to aftertreatment system 212, and these systems can utilize the information to accomplish aftertreatment of the exhaust gas flow in accordance with the methods described above.

Figure 6:
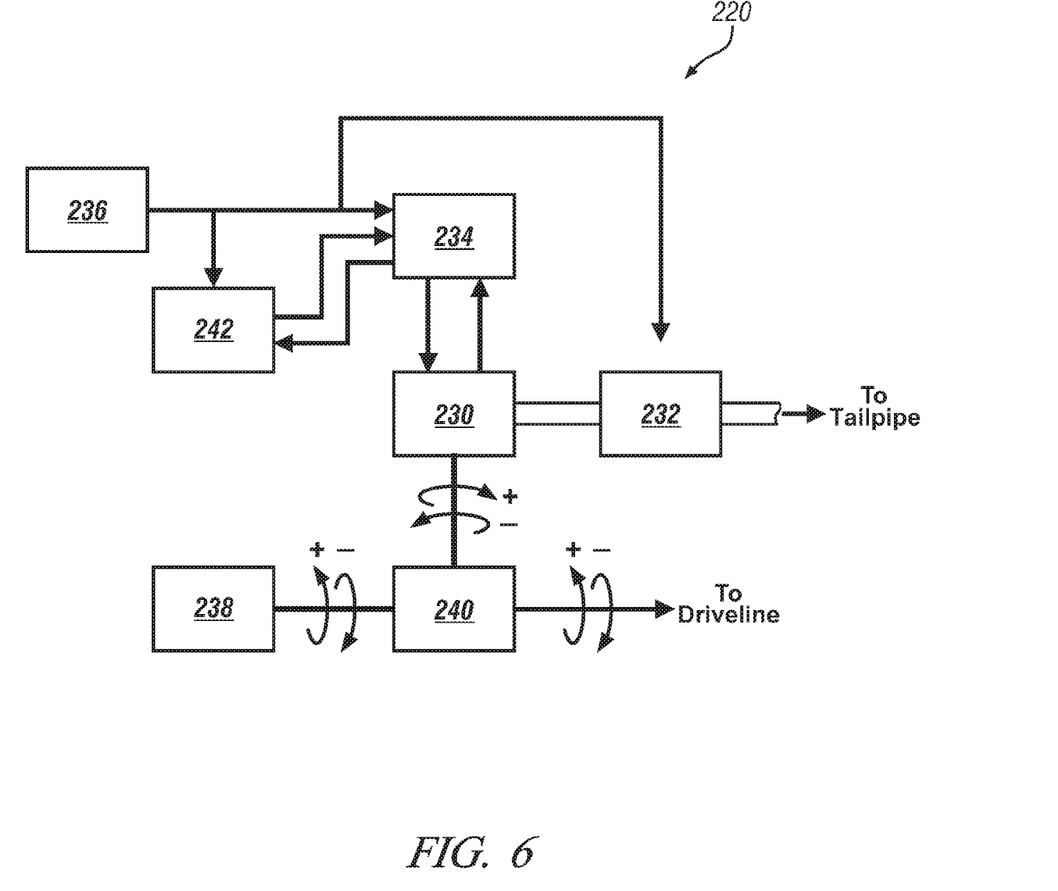
FIG. 6 schematically depicts a hybrid powertrain within a vehicle utilizing a 3D map device, in accordance with the present disclosure.

FIG. 6 schematically depicts a hybrid powertrain within a vehicle utilizing a 3D map device, in accordance with the present disclosure. Powertrain 220 includes engine 230, aftertreatment system 232, engine control module 234, electric machine 238, hybrid control module 242, transmission 240, and 3D map device 236. Engine 230 and electric machine 238 interact with transmission 218 in order to accomplish the operation of the powertrain. An exhaust gas flow resulting from combustion within engine 230 is processed through aftertreatment system 232 and eventually to a tailpipe. Engine control module 234 monitors various inputs and interactively controls the operation of engine 230, including operation within a hybrid control strategy provided by hybrid control module 242. Hybrid control module monitors various inputs, determines the hybrid control strategy by methods known in the art, and provides control instructions to electric machine 238 and engine control module 234. 3D map device 236 receives information related to the environment and a predicted route of the vehicle. 3D map device 236 provides information to hybrid control module 242, engine control module 234, and to aftertreatment system 232, and these systems can utilize the information to accomplish aftertreatment of the exhaust gas flow in accordance with the methods described above.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method for managing an exhaust aftertreatment system within a vehicle comprising a catalyst device, the method comprising:

monitoring a digital map device providing a predicted vehicle operating condition through a travel route;

determining a predicted exhaust gas temperature profile based upon said monitoring said digital map device; and controlling operation of said aftertreatment system based upon said predicted exhaust gas temperature profile, said controlling comprising one of scheduling ammonia generation in said aftertreatment system based upon predicting conditions enabling ammonia production based upon said predicted exhaust gas temperature profile, controlling a hybrid powertrain based upon said predicted exhaust gas temperature profile to facilitate said operation of said aftertreatment system, controlling said hybrid powertrain comprising one of scheduling operation under battery power and fuel power such that fueled operation is scheduled to facilitate catalyst regeneration and scheduling operation of an electric machine of said hybrid powertrain to achieve engine operation facilitating said operation of said aftertreatment system, scheduling operation in a first homogeneous charge compression ignition combustion mode and operation in a second combustion mode to facilitate said operation of said aftertreatment system based upon said predicted exhaust gas temperature profile, and scheduling operation of a bypass valve to protect a temperature sensitive device of said aftertreatment system based upon said predicted exhaust gas temperature profile.

2. The method of claim 1, wherein said catalyst device comprises a three way catalyst device, said exhaust aftertreatment system further comprises a selective catalytic reduction device, and controlling operation of said aftertreatment system further comprises managing ammonia production in said three way catalyst device for use in said selective catalytic reduction device.

3. The method of claim 2, wherein said exhaust aftertreatment system further comprises a lean NOx trap, and said method further comprises controlling regeneration of said lean NOx trap.

4. The method of claim 1, wherein controlling operation of said aftertreatment system further comprises utilizing an auxiliary heating device to predictively heat said catalyst device by preheating said catalyst based upon expected engine start-up to operate said catalyst device at an operational temperature at engine start-up.

5. The method of claim 4, wherein said catalyst device comprises a selective catalytic reduction device.

6. The method of claim 5, wherein said exhaust aftertreatment system further comprises a lean NOx trap located downstream of said auxiliary heating device.

7. The method of claim 5, wherein said exhaust aftertreatment system further comprises a three-way catalyst device located downstream of said auxiliary heating device and upstream of said selective catalytic reduction device.

8. The method of claim 1, wherein controlling operation of said aftertreatment system further comprises utilizing an auxiliary heating device to predictively heat said catalyst device in to maintain a minimum catalyst temperature.

9. The method of claim 8, wherein said catalyst device is a lean NOx trap.

10. The method of claim 8, wherein said catalyst device is a selective catalytic reduction device.

11. The method of claim 8, wherein said catalytic device is a lean NOx trap, said exhaust aftertreatment system further comprises a selective catalytic reduction device, and said method further comprises controlling operation of said selective catalytic reduction device based upon said determining said predicted exhaust gas temperature profile.

12. The method of claim 8, wherein said catalyst device is a three way catalyst device.

13. The method of claim 8, wherein said vehicle includes a hybrid powertrain, and said utilizing said auxiliary heating device to predictively heat said catalyst device to maintain said minimum catalyst temperature includes heating based upon a hybrid control strategy.

14. The method of claim 8, wherein said catalyst device is a diesel oxidation catalyst device.

15. The method of claim 14, wherein said exhaust aftertreatment system further comprises a particulate filter device, and said method further comprises controlling regeneration of said particulate filter device.

16. The method of claim 1, wherein controlling operation of said aftertreatment system further comprises utilizing an air induction device to predictively cool said catalyst device to maintain a maximum catalyst temperature.

17. The method of claim 1, wherein said controlling operation of said aftertreatment system further comprises utilizing an air induction device to predictively introduce oxygenated air into said catalyst device during predicted lean engine operation to allow for favorable treatment of NOx.

18. The method of claim 1, wherein said controlling operation of said aftertreatment system further comprises modulating engine operating modes includes retarding a spark timing.

19. The method claim 1, wherein said controlling operation of said aftertreatment system further comprises modulating engine operating modes includes late in-cylinder fuel injection.

20. The method claim 1, wherein said controlling operation of said aftertreatment system further comprises modulating engine operating modes includes injecting fuel into said exhaust gas flow.

21. The method of claim 1, wherein controlling operation of said aftertreatment system further includes modulating engine operating modes to manage the exhaust gas content flowing to the catalytic device.

22. The method of claim 21, wherein modulating engine operating modes including selecting between lean engine operation, rich engine operation, and stoichiometric engine operation among different engine cylinders.

23. The method of claim 21, wherein modulating engine operating modes includes selectively implementing premixed charge compression ignition operation.

24. The method of claim 21, wherein modulating engine operating modes includes selectively implementing stratified charge operation.

25. The method of claim 1, wherein controlling operation of said aftertreatment system further comprises protecting said catalyst device from thermal changes as a result of engine start/stop events.

26. The method of claim 1, wherein controlling operation of said aftertreatment system further includes utilizing an engine start/stop strategy to modulate exhaust gas temperatures fed to said catalyst device.

27. The method of claim 1, wherein controlling operation of said aftertreatment system further includes modulating hybrid powertrain operating modes to manage the exhaust gas content flowing to the catalytic device.

28. Method for managing exhaust gas temperatures within an exhaust aftertreatment system within a vehicle comprising a catalyst device, the method comprising:

monitoring a digital map device providing a predicted vehicle operating condition through a travel route;

determining a predicted exhaust gas temperature profile based upon said monitoring said digital map device; and controlling operation of said aftertreatment system based upon said predicted exhaust as temperature profile, said controlling configured to achieve desired exhaust gas temperatures, said controlling comprising one of controlling a hybrid powertrain based upon said predicted exhaust gas temperature profile to facilitate said operation of said aftertreatment system, controlling said hybrid powertrain comprising one of scheduling operation under battery power and fuel power and scheduling operation of an electric machine of said hybrid powertrain to achieve engine operation facilitating said operation of said aftertreatment system, and scheduling operation in a first homogeneous charge compression ignition combustion mode and operation in a second combustion mode to facilitate said operation of said aftertreatment system based upon said predicted exhaust gas temperature profile.

29. The method of claim 28, wherein controlling operation of said aftertreatment system further comprises selectively implementing electrical heating of said catalyst device to maintain a minimum catalyst temperature.

30. The method of claim 28, wherein controlling operation of said aftertreatment system further comprises utilizing an engine start/stop strategy.

31. The method of claim 28, wherein controlling operation of said aftertreatment system further comprises diverting exhaust gas away from said catalyst device to avoid high temperature exhaust gas reaching said catalyst device.

32. The method of claim 28, wherein controlling operation of said aftertreatment system further comprises injecting air into the exhaust aftertreatment system to modulate high exhaust gas temperatures.

33. The method of claim 28, wherein controlling operation of said aftertreatment system further comprises:

selectively electrically heating said catalyst device to maintain a minimum catalyst temperature;

selectively modulating engine operating modes including selecting between lean engine operation, rich engine operation, and stoichiometric engine operation;

selectively utilizing an engine start/stop strategy;

selectively diverting exhaust gas away from said catalyst device to avoid high temperature exhaust gas reaching said catalyst device; and selectively injecting air into the exhaust aftertreatment system to modulate high exhaust gas temperatures.

* * * * *